United States Patent [19]

Bischlipp et al.

[11] 4,381,907
[45] May 3, 1983

[54] APPARATUS FOR MANUFACTURING INSULATING CONSTRUCTION PROFILES

[75] Inventors: Klaus Bischlipp, Sprockhövel; Jürgen Pfeiffer, Balve; Paul Kannert, Lüdenscheid, all of Fed. Rep. of Germany

[73] Assignee: Eduard Hueck KG, Luedenscheid, Fed. Rep. of Germany

[21] Appl. No.: 313,985

[22] Filed: Dec. 22, 1981

Related U.S. Application Data

[63] Continuation-in-part of Ser. No. 129,887, Mar. 13, 1980.

[30] Foreign Application Priority Data

Mar. 4, 1979 [DE] Fed. Rep. of Germany ....... 2913254
Oct. 12, 1979 [DE] Fed. Rep. of Germany ....... 2941354

[51] Int. Cl.³ .............................................. B29D 27/04
[52] U.S. Cl. ................................ 425/110; 49/DIG. 1; 264/45.8; 264/46.6; 264/46.7; 425/117; 425/817 C
[58] Field of Search .................... 264/46.4, 46.6, 46.7, 264/45.8; 425/110, 117, 817 C; 49/DIG. 1

[56] References Cited

U.S. PATENT DOCUMENTS 3,624,885 12/1971 Holliday et al. ..................... 425/110
3,786,121 1/1974 Schaerer ......................... 264/46.4 X
3,832,818 9/1974 Nahr .............................. 264/46.6 X
4,128,934 12/1978 Doring ........................... 264/46.7 X
4,185,439 1/1980 Bischlipp et al. ................ 264/46.5 X

FOREIGN PATENT DOCUMENTS 1343902 1/1974 United Kingdom .

Primary Examiner—Philip E. Anderson
Attorney, Agent, or Firm—Michael J. Striker

[57] ABSTRACT

An apparatus for manufacturing insulating construction profiles having two metal profiles spaced from each other to define a channel filled with an insulating compound includes a supporting table to support a plurality of metal strands successively positioned in advanced movement along the table by transport rollers. Each strand includes a pair of metal profiles spaced from each other and connected with a temporary bridging strip in their advancing path. A first pouring device is positioned in the path of the advancing profiles to fill an insulating material into the channel between two metal profiles in each strand to form a first insulating core and a second pouring device is provided to introduce insulating material into the same channel to form a second insulating core. Between the two pouring devices a strip supply roll, a guide arrangement and a pressure roller are arranged to apply a separating strip between the two insulating cores which is vertically spaced from the temporary bridging strip. A cutting arrangement is provided to remove the temporary bridging strip.

23 Claims, 15 Drawing Figures

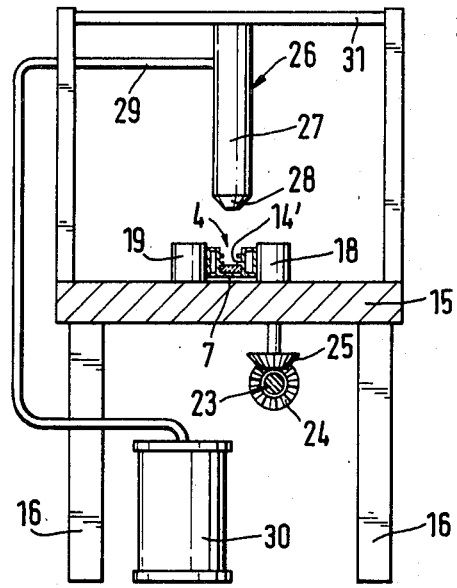
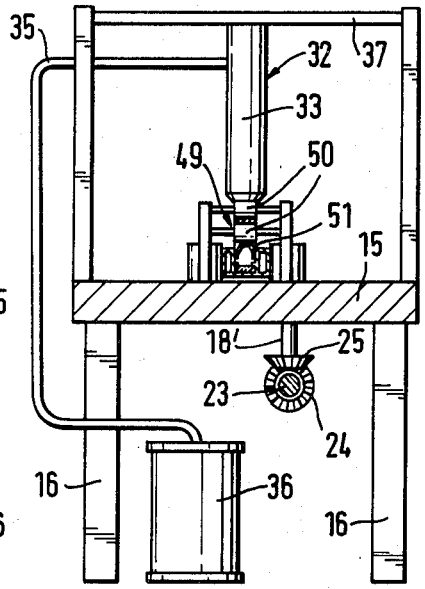
FIG. 4
FIG. 6
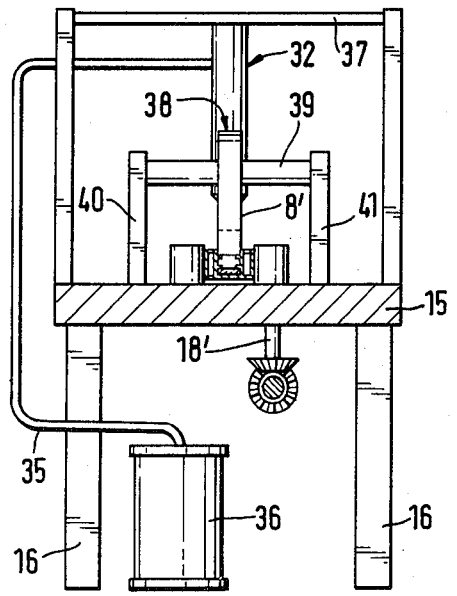
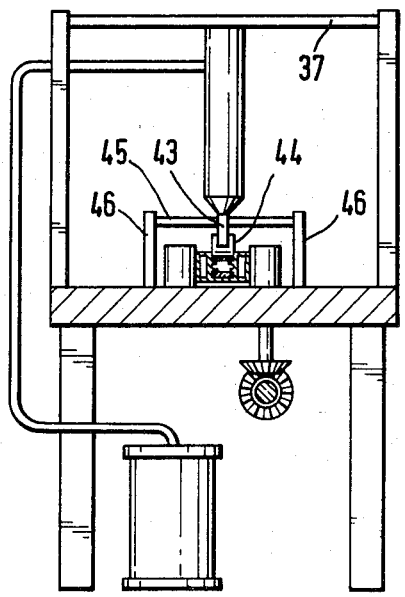
FIG. 5
FIG. 7

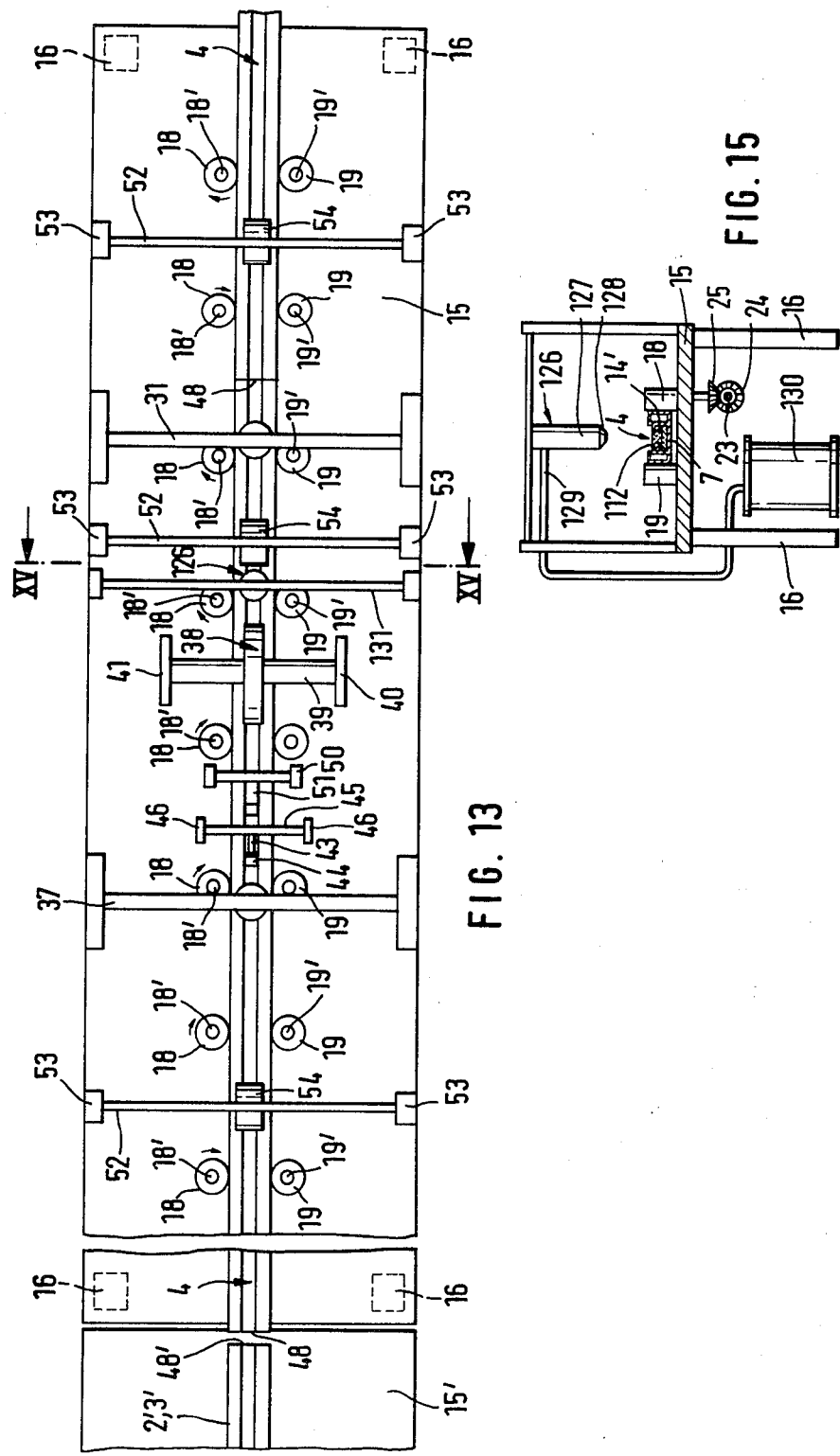

APPARATUS FOR MANUFACTURING INSULATING CONSTRUCTION PROFILES

CROSS-REFERENCE TO A RELATED APPLICATION

The present application is a continuation-in-part of the application Ser. No. 129,887 filed Mar. 13, 1980.

BACKGROUND OF THE INVENTION

Field of the Invention

The present invention relates to apparatus for producing insulating construction profiles, utilized in particular for windows, door frames, facades or the like.

The known construction profiles include a pair of metal profiles spaced from each other to form a channel which is filled with a material of low thermal conductivity, usually synthetic material which may be preferably a casting resin. In conventional arrangements for manufacturing such profiles metal profiles are positioned in advanced movement along a supporting table under pouring devices which discharge the filling material into the channel between the metal profiles.

The German patent DE-OS No. 21 60 253, for example, discloses a known arrangement for filling a channel formed between two spaced metal profiles with casting resin, wherein the entire channel is filled with the filler. However, the manufacture of the construction profiles having two superposed spaced one from another insulating cores disposed within the channel between the metal profiles and forming a space which is eventually filled with an additional thermally insulating material is not disclosed in the prior art.

SUMMARY OF THE INVENTION

It is therefore an object of the present invention to provide an apparatus for producing insulating construction profiles having at least two superposed insulating cores disposed within a channel formed between two metal profiles and constituting a space therebetween.

Another object of the invention is to provide such an apparatus which is inexpensive and easy in operation.

In pursuance of these objects, and others which will become apparent hereafter, one aspect of the invention resides in the provision of the apparatus of the foregoing type with supporting means to support a plurality of successively positioned metal strands each having two spaced metal profiles connected to each other with a temporary bridging strip attached to their bottom ends, transport means to advance these metal strands in their path along the supporting means, first pouring means to introduce filling material into a channel formed between the two metal profiles to form a first insulating core, second pouring means to fill the filling material into the same channel to form a second insulating core and means for introducing a separating strip into the channel between the first insulating core and the second insulating core which is placed into the channel in vertically spaced relation with the temporary bridging strip. The separating strip introducing means are positioned in the path of the advancing metal profiles between the first pouring device and the second pouring device.

Another aspect of the invention resides in that an additional pouring arrangement is provided in the apparatus for filling an insulating mass into the space between the insulating cores. This arrangement is positioned in the path of the advancing profiles and is added to the apparatus without any distortion of the continuous working cycle. This additional pouring device permits to obtain insulating profiles of high stability and of a better insulating action.

It has been found advantageous to place the additional pouring arrangement for filling a synthetic material such as, for example, a foamable synthetic plastic mass, into the profile channel in the path of the advancing profiles downstream the first pouring device but before the arrangement for introducing the separating strip into the channel. A control arrangement to control the amount of insulating material may be provided on the additional pouring device.

The formation of more than two insulating cores simultaneously with introducing an insulating synthetic mass into the profile channel may be arranged in a continuous working cycle by provision of additional pouring devices. The invention provides such a coordination between the filling insulating compound into the profile channel and the introduction of the separating strip in the working line that the space occupied by the equipment may be very small.

It has been found expedient to position the first and second pouring devices so that they are spaced one from the other at a distance which is substantially shorter than the length of the one profile strand.

Still another aspect of the invention resides in that the separating strip introducing means include a strip supply roll carrying a strip which is unrolled in the direction of the advancing metal profiles. The strip supply roll may be positioned immediately after the additional pouring device. The supply roll is rotatably mounted on an axle which is arranged traversally to the path of the advancing metal profiles.

The drive means for the strip supply roll may be mechanically connected to and synchronized with the transport means for advancing movement of the metal profiles. The end of the strip being unrolled from the strip supply roll is affixed to one of the advancing metal profiles and is unrolled upon the advancing movement of the profile strands. In this case the provision of special drive means for the strip supply roll is superfluous.

The strip introducing means further include a pressure roll which places the separating strip within the profile channel and is arranged on a rocking lever. The guide arrangement to support the end portion of the unrolling strip in its path toward the advancing metal profiles is provided in the apparatus.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

BRIEF DESCRIPTION OF THE DRAWING

FIG. 4 is a sectional view taken along line IV—IV of FIG. 2;

FIG. 5 is a sectional view taken along line V—V of FIG. 2 in the area of location of a separating strip supply roll;

FIG. 6 is a sectional view taken along line VI—VI of FIG. 2 in the area of location of a guide arrangement for a separating strip;

FIG. 7 is a sectional view taken along line VII—VII of FIG. 2 in the area of location of pressure roller of the guide arrangement;

FIG. 13 is a plan view of FIG. 12;

FIG. 15 is a sectional view taken along line XV—XV of FIG. 13 illustrating an additional pouring device.

DETAILED DESCRIPTION OF THE INVENTION

Figure 3:
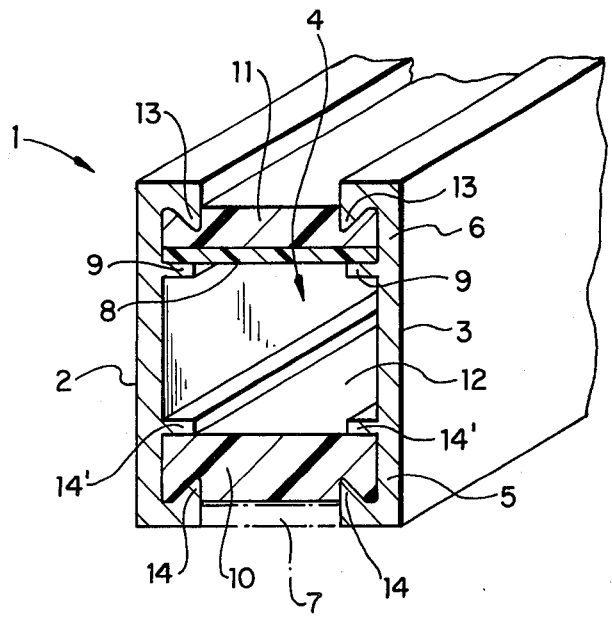
FIG. 3 is a partial perspective view, partly sectioned, of a construction profile produced on the apparatus of the invention.
Figure 14:
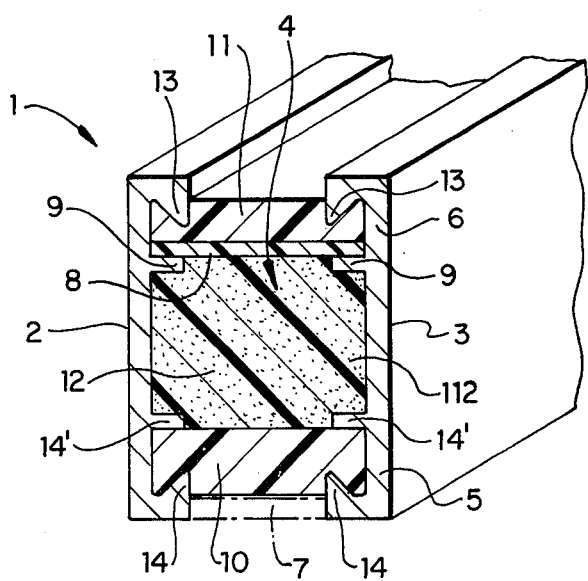
FIG. 14 is a perspective view, partly sectioned, of the construction profile manufactured in the apparatus of the invention.

Referring to the drawings, FIGS. 3 and 14 illustrate a construction profile which includes two metal profiles 2 and 3 spaced one from another to define a channel 4 therebetween. Two superimposed portions 5 and 6 are provided within the channel 4 to embrace a space 12 inside of the construction profile. The lower channel portion 5 is bridged at the bottom thereof with a metal temporary strip-shaped wall 7 shown in a dotted line, which connects metal profiles 2 and 3 to each other by any conventional means, as for example by extrusion. This temporary wall arranged between two metal profiles will be removed later in a manufacturing process.

The construction profile also includes a separating intermediate strip 8 spaced in a vertical direction from the bottom wall or strip 7 and arranged on the inwardly projecting webs 9 which are longitudinally extended along the length of the metal profiles. The lower channel portion 5 is filled with an insulating mass which is introduced in a casting state and forms an insulating core 10 upon binding of the filler. The upper channel portion 6 provides a further connection between two metal profiles 2 and 3 by means of an insulating core 11. Such insulating cores are made of a known hardenable heat insulating material. A free space 12 provided between the insulating cores 10 and 11 and illustrated in FIG. 3 is filled with an insulating material preferably with a foamable synthetic plastic mass 112 shown in FIG. 14, which is inserted into the construction profile to improve its insulating action by the high level of stability of the insulating compound. The connection between the metal profiles 2, 3 and the insulating cores 10, 11 is provided with the aid of the projecting webs 13, 14 and 14'.

It should be understood that the construction profile depicted in FIGS. 3 and 14 may be of variable shapes and should not be limited by a shape described herein above.

An apparatus for manufacturing a construction profile is illustrated in FIGS. 1, 2, 12 and 13. The apparatus of the invention includes a working table 15 positioned on the supporting members or feet 16 located on the ground. The working table 15 which may be any other suitable supporting means provides a bearing surface for the metal profiles 2, 3 which are advanced between transport rollers 18, 19 in a direction shown by arrow 17. The rollers 18, 19 are mounted on the vertical axes or shafts 18', 19' arranged on the working table 15. The rollers 18 positioned at one side of the working table are fixedly mounted on the shafts 18' which are driven by means which will be explained below, whereas the rollers 19 positioned at the other side of the working table 15 are not connected to drive means and serve merely as the guide members for rotatable rollers 18 due to a friction between the rollers and the metal profiles 2, 3 engaged therewith. A motor 20 located below the working table 15 serves as a drive source for rotation of the rollers 18. The outlet shaft of the motor 20 is connected to a pinion 21 which in turn is connected to a gear 22 affixed on a shaft 23 extending along the length of the working table and carrying a number of bevel gears 24. The bevel gears 24 mesh with corresponding bevel gears 25 each of which is rigidly connected to the corresponding shaft 18' so that the rotating movement of the motor shaft is transmitted to the rollers 18.

Figure 1:
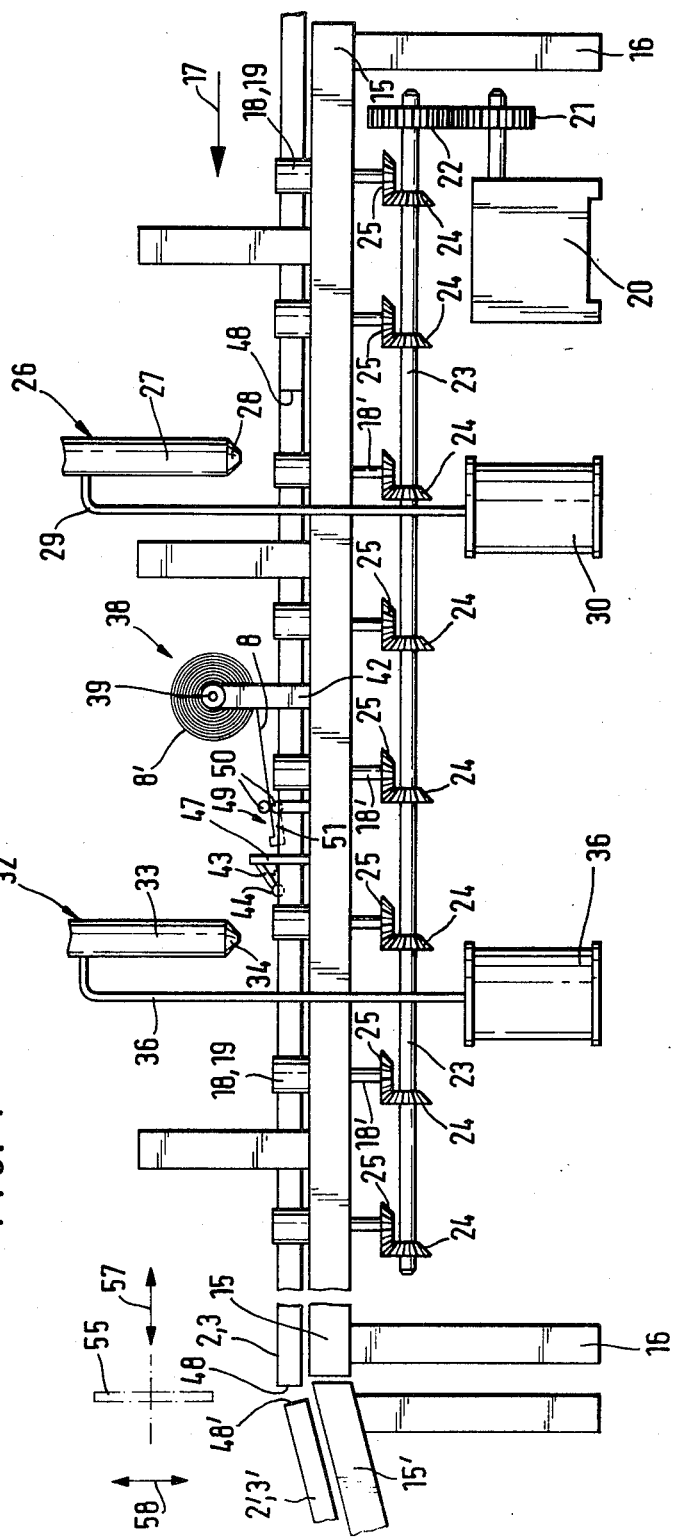
FIG. 1 is a side view illustrating an apparatus of the invention.
Figure 2:
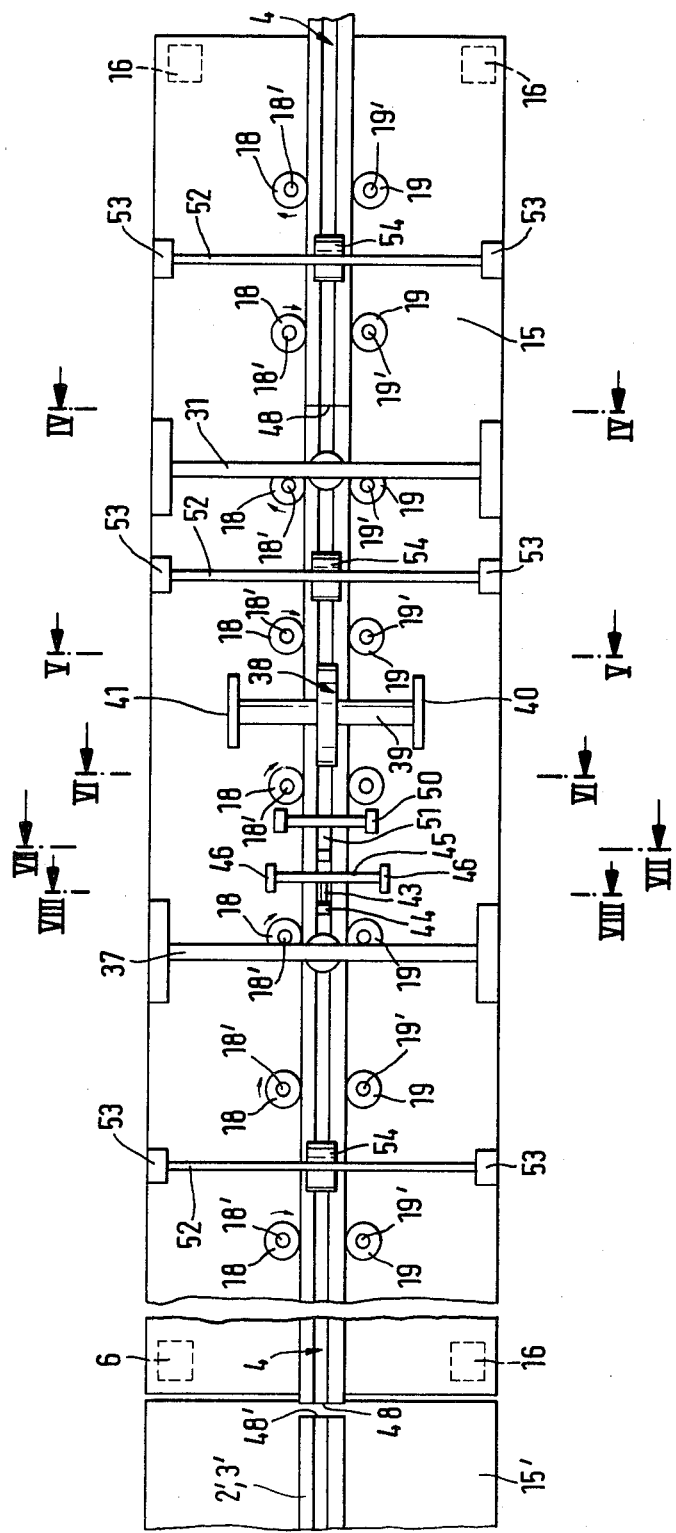
FIG. 2 is a plan view of the apparatus shown in FIG. 1.

A first pouring device indicated as 26 is located above the working table (FIGS. 1, 2, 4). The pouring device 26 includes a filling or pouring head 27 and a discharging nozzle 28. The filling head 27 is connected with a compound storage tank 30 via a conduit 29. The filling head 27, as shown in FIG. 4, is suspended on a support element 31 which is rigidly connected to the working table 15. As the filling compound such as the known casting resin is discharged in a liquid state from the nozzle 28 the compound is solidified according to its curing period. The discharge of the fillers may be provided with the aid of a pump not shown in the drawings.

Figure 8:
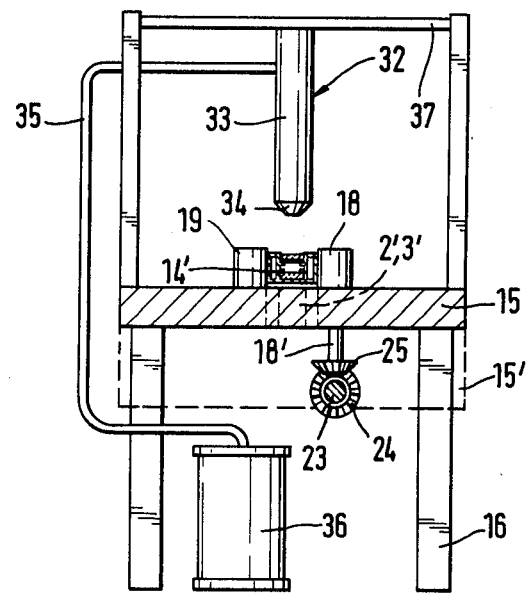
FIG. 8 is a sectional view taken along line VIII—VIII of FIG. 2 in the area of location of a second pouring device.

In the transport direction 17 upstream the first pouring device 26, a second pouring device 32 shown in FIGS. 1, 2, 8 is positioned above the working table 15 having a filling head 33 and a discharging nozzle 34 similar to those provided for the first pouring device 26. The filling head 33 rigidly connected to the working table by means of a supporting element 37 is associated with a material storage tank 36 via a conduit 35.

Between the first and the second pouring devices a strip supply roll 38 is arranged above the working table 15 to supply a separating strip 8 to the metal profiles 2, 3 as the latter are continuously advanced in the transport direction (FIGS. 1, 2, 5 and 13). The supply roll 38 includes a winding 8' mounted on a traversally extending axis 39 and is freely rotated in the bearings 40, 41 supported by the supporting member 42 connected to the table 15.

Upstream to the supply roll 38 a strip guide arrangement 49 (FIG. 6) is mounted which includes two guide rollers 50 and a convexly-shaped plate 51 curved in its cross-section in order to facilitate the insertion of the strip 8 onto the inwardly projecting webs 9 formed in the metal profiles 2, 3. The use of the special guide plate 51 is specifically expedient when the width of the separating strip 8 is greater than the width of the upper channel portion 6 of the construction profile.

Next to the strip guide arrangement 49 in the transport direction, a freely rotating pressure roller 44 positioned on a rocking lever 43 is provided which serves to place the separating strip 8 and to uniformly press the latter onto the webs 9 of the metal profiles 2, 3 (FIGS. 1, 2, 7). The rocking lever 43 is supported at its one end on an axis 45 which in turn is supported between two bearing boxes 46 arranged in the supporting members 47 mounted on the working table 15. In order to achieve the required pressure on the separating strip 8, the rocking lever is loaded by a spring (not shown) or by its own weight.

A third pouring device 126 (FIGS. 12, 13) is arranged between the first pouring device 26 and the strip supply roll 38 which is of a similar construction as the above-described pouring devices 26 and 32. The pouring arrangement 126 also includes a filling head 127 and a discharging nozzle 128. The filling head is mounted on the support element 131 affixed to the working table and is connected to a filler storage tank 130 by a conduit 129. The filling material, such as known foamable polyurethan resin reaction mixture, is fed in a plastic state from the discharging nozzle 128 and solidified for a reaction period which is controlled and may be preselected by any suitable control arrangement not shown in the drawings. The additional pouring arrangement 126 is provided in the apparatus for filling the space 12 of the channel 4 with the insulating material.

In operation, two spatially positioned metal profiles 2, 3 connected with the temporary bottom strip 7 are placed onto the table 15 in a form of longitudinally extending profile strands which are a one-piece unit as shown in FIGS. 1, 2, 12 and 13. The strands are mounted between the transport rollers 18, 19. The distance between the rollers 18 and 19 in each pair of the transport rollers may be adjusted in order to accommodate the transport rollers for the metal profiles of variable sizes. As the rollers 18 are driven by the motor 20, the shaft 23 and the bevel gears 24, 25, the metal profiles 2, 3 are advanced in the direction shown by arrow 17 and moved to meet a first pouring device 26. During the passing of the filling head 27 the plastic material is continuously and uniformly applied to the advancing profile into the open channel 4 formed within the metal profiles 2, 3 connected with the bottom strip 7 (FIG. 4). The transport velocity of the profile strands corresponds to the velocity of the flowing material for filling the channel 4 so that the compound mass fills the channel 4 up to the level limited by the bottom inwardly projecting webs 14 and provides a uniform compound layer along the entire length of the metal profiles.

Figure 12:
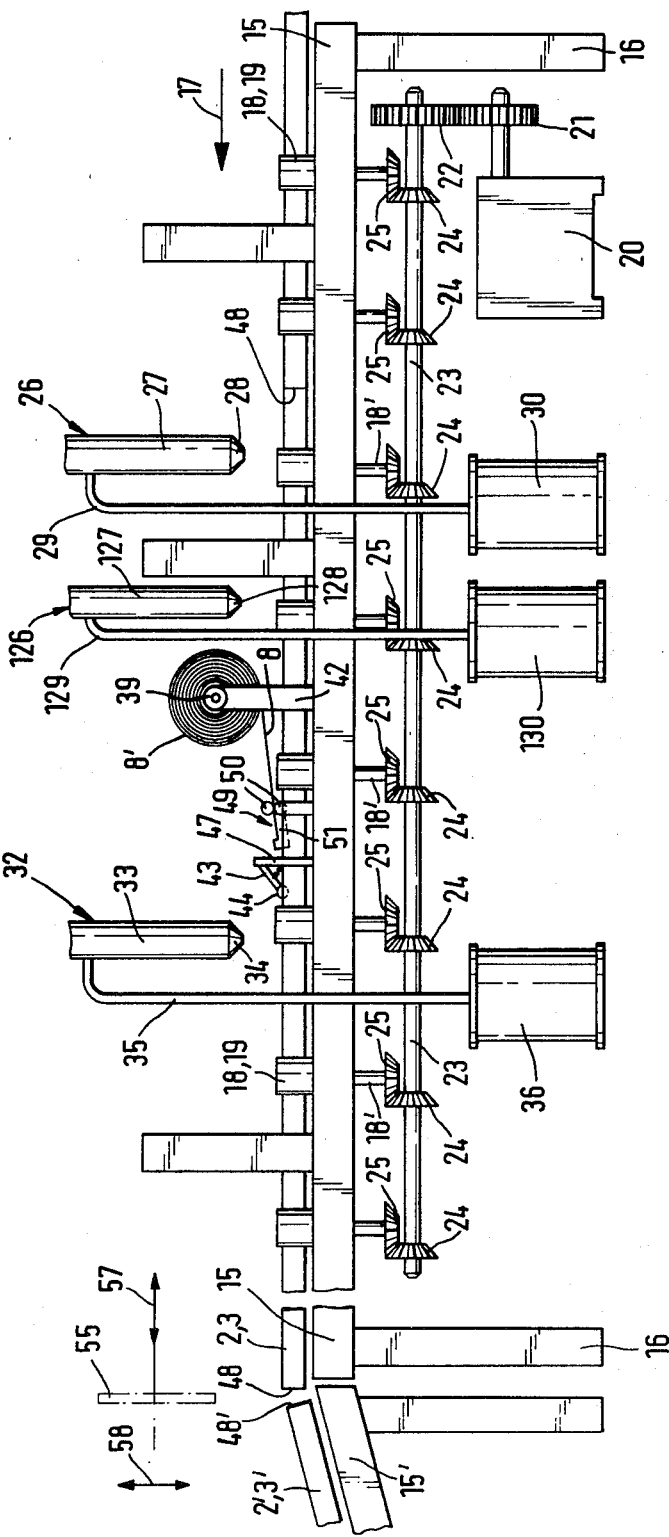
FIG. 12 is a side view of an apparatus similar to FIG. 1 but showing an additional pouring device utilized in the apparatus of the invention.

As the front end surfaces 48 of the metal profiles reach the additional pouring device 126, the filling mass is continuously discharged from the nozzle 128 and uniformly applied to the channel 4 in a manner similar to that of the first pouring device 26 to fill the space 12 (FIG. 12). In this station the channel 4 will be filled up only to the predetermined level defined by the webs 9 in order not to prevent successive introduction of the separating strip 8. As the front end surfaces 48 of the strands are further continuously advanced in the working cycle, the metal profiles 2, 3 reach the strip supply roll 38 which delivers a free end of the winding 8' via the strip guide arrangement 49 (FIGS. 5, 6) to the projecting webs 9.

During the further advancing movement of the metal profiles 2, 3 the pressure roller 44 with its own weight or the additional weight added thereto pressures the strip 8 as the metal profiles are continuously moved with the transport velocity in the transport direction. As soon as the space 12 is filled with the filling compound and the separating strip is placed onto the projecting webs 9, the advancing metal profiles 2, 3 reach the second pouring device 32 which operates in the same manner as the pouring arrangements 26 and 126. The pouring device 32 serves to fill the upper channel portion 6 with the filling mass as shown in FIG. 8. The working cycle is so arranged that the space 12 is completely filled with a filler upon the termination of curing period. The reaction time and the expansion rate of the insulating material 112 (FIG. 14) are so controlled during the working time that the remaining working process may not be deteriorated. In case the space 12 should not be filled with the insulating material the additional pouring arrangement 126 is not used in the working cycle.

In order to prevent the leakage of the filling material which may occur at the front end surfaces 48 of the channel 4 during the fabricating process these end surfaces may be closed by means of tape strips or the like. The covering of the end surfaces of the metal profiles is not necessary where the front end surface of one profile strand is located immediately after the rear surface of the preceding strand or two successive strands are positioned closely to each other so that the channels 4 of two successive profiles are passing along the table without interruption. It is evident that the end surfaces of the first and the last profiles in the metal profile chain should be covered with the tape strips. This operation step is made once at the beginning of the working shift wherein the front end of the first advancing profile to be filled with the filling resin is covered and again at the end of the shift when the trailing open end of the final metal profile is closed.

The placing all the successive profile strands continuously without a break in their continuous path in the transport direction for filling them with the insulating mass may prevent the formation of air spaces in the solidified insulating material caused by the shrinkage of this material.

After filling two superposed channel portions with the filling mass as was described above, the filled metal profiles are advanced further along the working table 15 with the constant velocity. As soon as the insulating material filled in the upper channel portion 6 is solidified, the advancing profile strand reaches a separating arrangement shown in FIGS. 1 and 12. The separating arrangement includes an elongated table 15' which may be a continuous part of the working table 15. The table 15' is provided with a supporting surface which is angularly inclined with respect to the horizontally extending working table 15. The advancing metal profiles indicated as 2', 3' are moved to the table 15' and taking the inclined position and under influence of their own weight the junction area between the profiles 2', 3' and 2, 3 is broken up, and the ends of the profiles 2', 3' are separated from the corresponding ends of the neighboring profiles 2, 3. It should be noted that the connection formed in the junction area between two neighboring strands is formed as a result of hardening of the insulating material in the place of separation between two respective adjoining insulating cores 10, 11, 112 and two adjoining separating strips of two neighboring profile strands.

The inclined separating table 15' may be replaced with a suitable saw 55 shown in FIGS. 1, 12 to separate two profile strands from each other. The saw 55 is arranged to be movable in two opposite directions parallel to the transport direction 17 and in the two opposite directions which are normal to the transport direction in order to adjust the saw with respect to the surface to be cut. It should be understood that any other conventional means to separate two connected strands may be utilized such as scissors, knives or the like.

Figure 9:
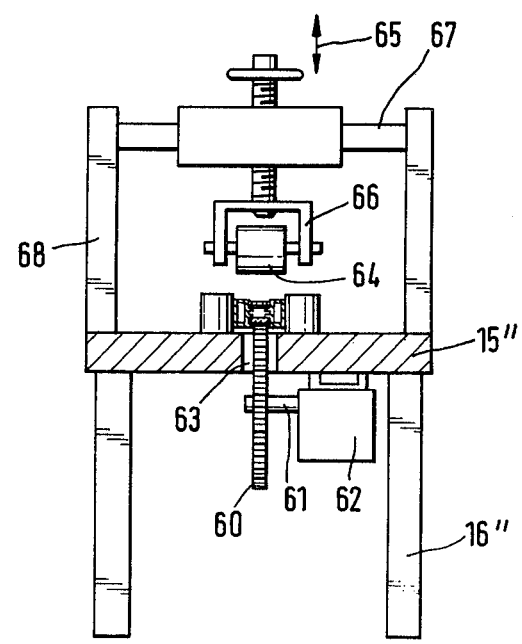
FIG. 9 is a sectional view taken along line IX—IX of FIG. 10 in the area of location of a cutting arrangement.
Figure 10:
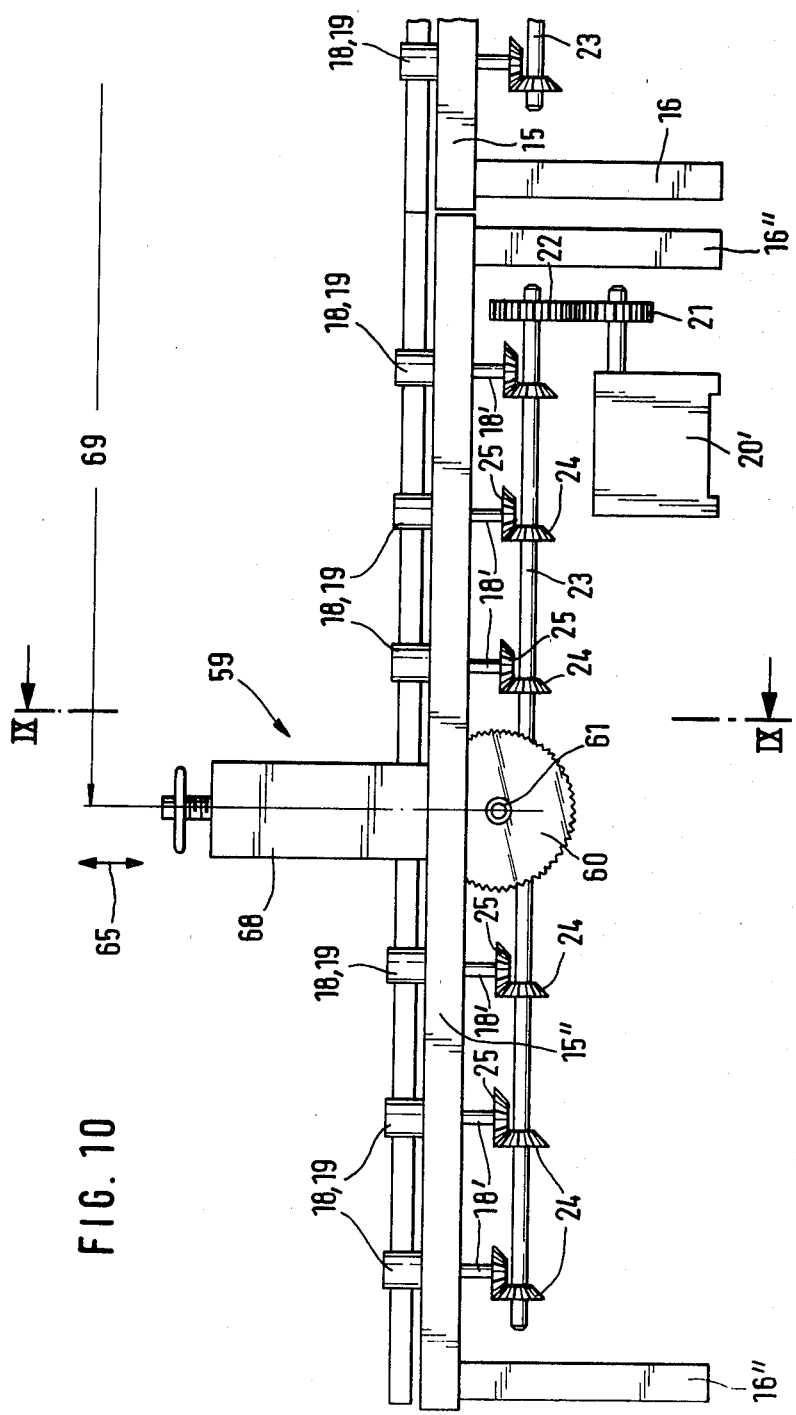
FIG. 10 is a side view of the cutting arrangement shown in FIG. 9.
Figure 11:
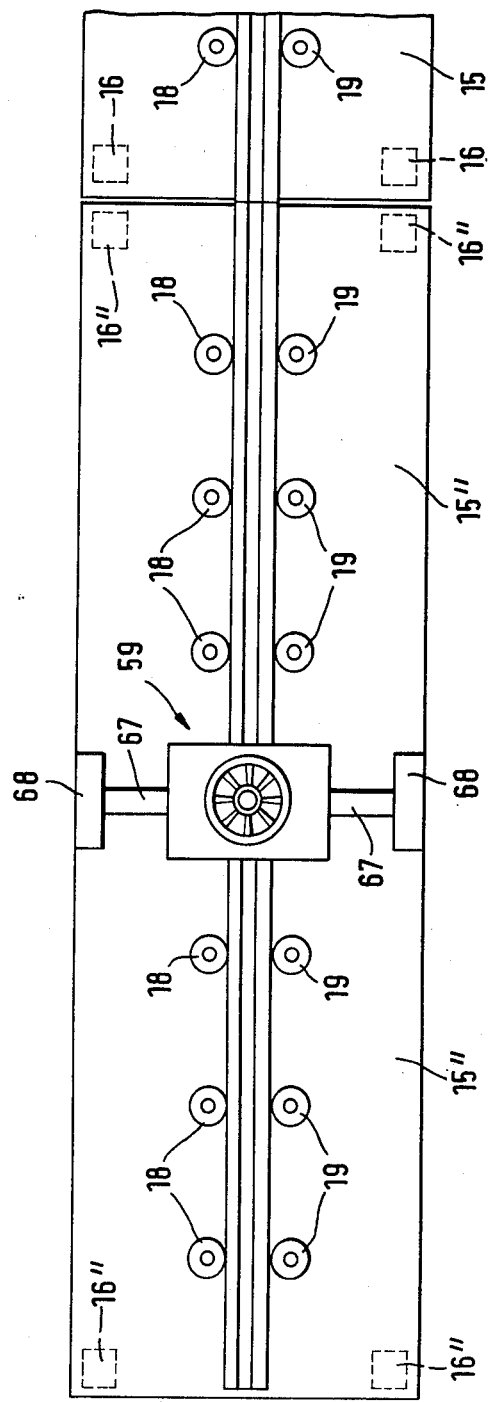
FIG. 11 is a plan view of the apparatus of the invention in the area of location of the cutting arrangement.

FIGS. 10 and 11 show a cutting device generally designated as 59 which serves for removing the temporary metal bridging strips 7 mounted between the lowermost ends of the metal profiles 2, 3. The cutting device 59 includes a saw 60 or a milling cutter or the like which is positioned under the table 15″, an elongated portion of the working table 15. The saw 60 is mounted on the shaft 61 of the motor 62 shown in FIG. 9. The operating surface 60 of the saw is introduced through an opening 63 bored in the table 15″ to extend in contact with the surface to be cut off. A freely rotatable roller 64 illustrated in FIG. 9 is arranged on the support 66 and is adjustable in a vertical direction as shown by arrow 65. The support 66 is fixedly connected to the table 15″ by means of racks 67, 68.

The metal profiles 2, 3 in this area are supported by engaging rollers 18, 19 in the manner described for the table 15. The advancing movement of the profiles 2, 3 is achieved via a motor 20′ and the gearing (FIG. 10) which are similar to those described above. It is essential to position the saw 60 so distant from the last pouring device 32 (this distance is indicated as 69 in FIG. 10) as to provide a sufficient time for the filling compound within the filled channel 4 in order to obtain its inherent stability before the profiles reach the saw and the temporary bridging strip 7 is removed.

The above-described operation is a continuous process of fabricating construction profiles which starts from filling the mass from the first pouring device and ends with separating the strands in the separating arrangements 15′ and 55.

It is evident that the separating device 55 for removing the temporary metal strip may be positioned in the working line before the separating arrangement 15′. This will provide an uninterrupted working process.

In the event when more than two insulating cores are required in the construction profile an additional pouring device should be provided for each additional insulating core and additional separating strip supply rolls should be arranged with additional pressure rollers and strip guide devices.

It is understood that it is possible to arrange the equipment so that several neighboring profiles may be manufactured simultaneously. In this case the filling heads and separating arrangements may be positioned parallel to each other in the working line.

The separating strip 8 is installed into the profile channel synchronously with the advancing movement of the metal profile strands. To achieve this a free end of the strip 8 is attached to the advancing ends of the first profile in a series of profile strands in the beginning of the operation cycle or after installation of the new winding 8″. The separating strip end 8 applied to the solidifying compound is fastened thereto by the adhesive force and the strip is unrolled from the supply roll 38 to be further introduced into the profile channel due to advancing movement of the profiles 2′, 3′ or 2, 3 without requirement of any additional drive arrangement to provide such unrolling. Instead of the tape strips any other suitable fastening means may be used such as claws which clasp the advancing ends of the profiles 2′, 3′.

It is also possible to install at the beginning or the ends of the pouring devices 26, 32, 126 the light barriers or any other automatically operative suitable arrangements.

It was found that instead of use of the temporary bridging strips 7 to provide one-piece metal profiles 2, 3 it is possible to utilize metal profiles spaced one from another by separating covers. In this case separating devices 15′ and 55 may be avoided.

FIG. 2 shows additional supporting rollers 54 to support the metal profiles 2, 3 from above. The rollers 54 are mounted on the supporting stands 52, 53 and may be adjusted in a vertical direction by any suitable adjusting means.

While the invention has been illustrated and described in an apparatus for manufacturing construction profiles, it is not intended to be limited to the details shown, since various mofifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for manufacturing insulating construction profiles of the type having two metal profiles spaced from each other to define an open channel therebetween which is filled with a filling material of low thermal conductivity forming insulating cores within said channel, comprising supporting means for supporting a plurality of successive metal strands each having two spaced metal profiles connected to each other with a temporary bridging strip attached to their bottom ends; transport means for advancing said metal strands in their path along said supporting means with a predetermined velocity; first pouring means for introducing said filling material into said channel of said advancing metal strands to form at least one insulating core upon hardening of said filling material; second pouring means for introducing said filling material into said channel to form a second insulating core, said first and second pouring means being positioned along the path of said advancing metal strands, and at least one means for introducing a separating strip into said channel between said first insulating core and said second insulating core to place said separating strip in a vertically spaced relation with said temporary bridging strip; said strip introducing means being positioned in the path of said advancing metal strands between said first pouring means and said second pouring means.

2. The apparatus of claim 1, wherein said filling material is a casting resin.

3. The apparatus of claim 2, further comprising third pouring means to introduce a synthetic material into said channel between said first insulating core and said second insulating core, said third pouring means being positioned in the path of said advancing metal strands between said first pouring means and said strip introducing means.

4. The apparatus of claim 3, wherein said synthetic material is a foamable synthetic plastic mass.

5. The apparatus of claim 4, further comprising control means operatively connected to said third pouring means to control the amount of synthetic material filled into said channel.

6. The apparatus of claim 5, wherein said first pouring means and said second pouring means are spaced one from the other in the path of said advancing metal profiles at a distance which is substantially shorter than the length of said metal strand.

7. The apparatus of claim 1, wherein said strip introducing means include a rotary strip supply roll operative for unrolling said separating strip with a velocity corresponding to said predetermined velocity.

8. The apparatus of claim 7, wherein said strip supply roll is positioned in the path of said advancing profiles immediately after said first pouring means.

9. The apparatus of claim 8, wherein said strip supply roll is rotatably mounted on an axis and provided with means for rotating said roll, said axis being extended in a direction transverse to the path of said advancing profiles.

10. The apparatus of claim 9, wherein said transport means and said means for rotating said roll are operatively connected and synchronized.

11. The apparatus of claim 9, wherein said strip introducing means further include at least one pressure roller to act on said separating strip upon its insertion into said channel.

12. The apparatus of claim 11, wherein said strip introducing means further comprise a rocking lever carrying said pressure roller.

13. The apparatus of claim 12, wherein said strip introducing means are provided with strip guiding arrangement having guiding rollers to support an end of said separating strip upon the unrolling movement thereof.

14. The apparatus of claim 13, further comprising a separating arrangement for separating the adjoining ends of the neighboring strands, said separating arrangement being positioned downstream said second pouring means in the path of said advancing strands to separate said adjoining ends connected to each other as a result of hardening of said filling material.

15. The apparatus of claim 14, wherein said separating arrangement is a saw.

16. The apparatus of claim 14, wherein said separating arrangement is a longitudinal table angularly positioned with respect to said supporting means.

17. The apparatus of claim 13, further comprising cutting means to remove said temporary bridging strip connecting said metal profiles in their advancing path.

18. The apparatus of claim 17, wherein said cutting means is positioned in the path of said advancing profiles and remote from said second pouring means at such a distance as to provide a sufficient time for complete hardening of said filling material inserted into said channel.

19. The apparatus of claim 18, wherein said cutting means is a saw.

20. The apparatus of claim 18, wherein said cutting means is a milling cutter.

21. The apparatus of claim 18, wherein said cutting means is provided with drive means.

22. The apparatus of claim 21, wherein said cutting means is located below said advancing metal profiles.

23. The apparatus of claim 22, wherein said drive means of said cutting means includes a horizontal shaft carrying said cutting means, said horizontal shaft being positioned transversally to the path of said advancing profiles.

* * * * *